US012774723B2

(12) United States Patent
Coenen et al.

(10) Patent No.: US 12,774,723 B2
(45) Date of Patent: Oct. 27, 2026

(54) COUNTER PRESSURE CHAMBER FOR HYDRAULIC CLUTCH

(71) Applicant: DANA BELGIUM, Bruges (BE)

(72) Inventors: Pauwel Coenen, Aalter (BE); Kurt Cattoor, Koolkerke (BE); Filip D. Schacht, Meulebeke (BE); Joachim Van Dingenen, Drongen (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 18/930,123

(22) Filed: Oct. 29, 2024

(65) Prior Publication Data

US 2025/0180078 A1 Jun. 5, 2025

Related U.S. Application Data

(60) Provisional application No. 63/604,576, filed on Nov. 30, 2023.

(51) Int. Cl.
*F16D 48/02* (2006.01)
*F16D 25/0638* (2006.01)

(52) U.S. Cl.
CPC ......... *F16D 25/14* (2013.01); *F16D 25/0638* (2013.01)

(58) Field of Classification Search
CPC ....... F16D 13/52; F16D 25/0638; F16D 25/14
See application file for complete search history.

(56) References Cited

U.S. PATENT DOCUMENTS

| | | | | |
|---|---|---|---|---|
| 5,538,121 | A * | 7/1996 | Hering | F16D 25/0638 192/70.14 |
| 6,035,989 | A * | 3/2000 | Matsuoka | F16H 45/02 192/85.25 |
| 11,111,970 | B1 * | 9/2021 | Wurst | F16D 25/0638 |
| 11,248,665 | B2 | 2/2022 | Cattoor et al. | |
| 11,698,113 | B1 * | 7/2023 | Allen | F16D 25/12 192/85.54 |
| 2012/0145511 | A1 * | 6/2012 | Wilton | F16D 25/12 192/85.17 |

(Continued)

FOREIGN PATENT DOCUMENTS

| | | | | |
|---|---|---|---|---|
| CN | 112443590 A | * | 3/2021 | F16D 25/10 |
| CN | 113062932 A | * | 7/2021 | F16D 13/52 |

(Continued)

OTHER PUBLICATIONS

Cattoor, K et al., "Method and Systems for a Clutch of an Electric Drivetrain," U.S. Appl. No. 18/330,242, filed Jun. 6, 2023, 38 pages.

*Primary Examiner* — Stacey A Fluhart
(74) *Attorney, Agent, or Firm* — McCoy Russell LLP

(57) ABSTRACT

Described herein are systems and methods for a hydraulic clutch. The hydraulic clutch includes a piston, a drum, a washer, an actuation chamber defined between the piston and the drum, and a counter-pressure chamber defined between the piston and the washer. The piston comprises a first portion for positioning an outer seal and a second portion for positioning an inner seal, where the outer seal and the inner seal share a common diameter. The actuation chamber comprises the outer seal, and is fluidly coupled to a work fluid supply channel. The counter-pressure chamber comprises the inner seal and a spring, and is fluidly coupled to a work fluid overflow channel.

17 Claims, 6 Drawing Sheets

(56) References Cited

U.S. PATENT DOCUMENTS

| | | | | |
|---|---|---|---|---|
| 2020/0346543 | A1* | 11/2020 | Naito | F16D 25/0638 |
| 2021/0265893 | A1* | 8/2021 | Moasher | B60K 6/26 |
| 2022/0381301 | A1* | 12/2022 | Ikemoto | F16D 25/123 |

FOREIGN PATENT DOCUMENTS

| | | | | | |
|---|---|---|---|---|---|
| DE | 102017213681 | A1 | * | 2/2019 | |
| DE | 102018000171 | A1 | * | 7/2019 | |
| DE | 102018201782 | A1 | * | 8/2019 | |
| EP | 2988014 | B1 | | 5/2018 | |
| JP | 2015214988 | A | * | 12/2015 | F16D 25/123 |

* cited by examiner

COUNTER PRESSURE CHAMBER FOR HYDRAULIC CLUTCH

CROSS REFERENCE TO RELATED APPLICATION

The present application claims priority to U.S. Provisional Application No. 63/604,576, entitled "COUNTER PRESSURE CHAMBER FOR HYDRAULIC CLUTCH", and filed on Nov. 30, 2023. The entire contents of the above-listed application are hereby incorporated by reference for all purposes.

TECHNICAL FIELD

The present description relates generally to a counter-pressure chamber for a hydraulic clutch.

BACKGROUND AND SUMMARY

Vehicles, including fully electric vehicles (EVs) and hybrid electric vehicles, may use electric machines to generate torque and power wheels of the vehicles. The electric machine may be included in an electric drivetrain, which may further include a transmission, a drive shaft, a drive axle, and one or more clutches for controlling torque from the electric machine to the wheels and other components therebetween. The transmission may be a gearbox with a plurality of gear sets. A clutch may be used to selectively and rotationally couple the transmission to rotational elements, such as the wheels.

Electric machines may produce a greater rotational speed compared to other forms of prime movers, such as internal combustion engines (ICEs). Centrifugal loads may be applied across a hydraulic clutch and introduced to a pressure chamber of a piston of the hydraulic clutch when the hydraulic clutch receives a rotational speed input (e.g., from an ICE and/or an electric machine). At high rotating speeds, centrifugal loads become higher and corresponding disadvantages, such as degradation of the piston, increase. Higher rotating speeds are more common with electric motors and overall electrification of clutch systems. Conventionally, a bleed hole is included in the hydraulic clutch to prevent self-closing of the clutch which may be caused by the centrifugal load. The bleed hole enables work fluid (e.g., oil) to escape from the pressure chamber, thus preventing the work fluid from being trapped in the pressure chamber when the clutch is open. Trapped work fluid would otherwise create a centrifugal load that may close the clutch on its own.

Springs are also used to hold the piston of the clutch in the preferred position. Springs that can withstand the highest possible centrifugal force are desired. Thus, as a centrifugal force increases (e.g., with increasing rotational speed), spring strength demand increases. To maintain an amount of torque transferred by the clutch at low centrifugal loads, a higher spring force is demanded. Additionally, an increase in pressure used to actuate the clutch (e.g., compress the spring) is demanded.

Additionally or alternatively, a number of discs included the clutch may be increased to assist with countering centrifugal load that may undesirably close the clutch. However, increasing the number of discs may reduce an efficiency of the clutch. It is desirable for a maximum cultch pressure to be sufficiently high to have the same clamp force onto the clutch discs at high centrifugal loads and at low centrifugal loads. Further, kiss pressure (pressure needed to move all the discs against each other without transmitting torque) is demanded to increase, which may make smooth closing of the clutch harder to control.

At higher rotating speeds, the centrifugal pressure in the pressure chamber behind the piston, also referred to herein as an actuation chamber, increases. When the clutch includes a bleed hole, an increase in potential pressure buildup demands an increase in the bleed hole size to reduce pressure build up. Increasing the size of the bleed hole increases losses when the clutch is closed, as pressurized oil is drained through the bleed hole. These losses are not feasible nor acceptable for desired clutch function. Because of limits of transmission pump sizing and efficiency, increasing bleed hole size does not sufficiency alleviate pressure buildup at higher centrifugal loads caused by high rotating speeds encountered today and beyond due to electrification/high speeds of electromotors.

The inventors herein have recognized these and other issues with such systems and have come up with a way to at least partially solve them. In one example, a hydraulic clutch includes a piston comprising a first portion for positioning an outer seal and a second portion for positioning an inner seal, where the outer seal and the inner seal share a common diameter, a drum, a washer, an actuation chamber, and a counter-pressure chamber. The actuation chamber is defined between the piston and the drum and comprises the outer seal. The counter-pressure chamber is defined between the piston and the washer, and comprises an inner seal, a spring, an inlet for a work fluid supply channel, and an outlet for a work fluid overflow channel.

As an example, a first centrifugal load may be applied to the actuation chamber and the hydraulic clutch. The counter-pressure chamber may provide a second centrifugal load opposite and equal to the first centrifugal load. The first and second centrifugal loads act against one another, reducing a net centrifugal loads that may self-close the clutch. In this way, sufficient pressure resistance and clutch actuation is enabled without a bleed hole. The hydraulic clutch system may not have a bleed hole for one of or each of the actuation chamber and the counter-pressure chamber.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems for a clutch assembly and related systems. As will be described in greater detail herein, the clutch assembly may include at least a clutch, where the clutch is a hydraulically actuated clutch. The hydraulically actuated clutch may be referred to herein as a hydraulic clutch. The hydraulic clutch may be a wet clutch. The hydraulic clutch may selectively couple a first rotational element to a second rotational element, where the first rotational element may be a first gear and the second rotational element may be a second gear. The first gear and the second gear may be of a first gear set and a second gear set, respectively, of a transmission.

Figure 1:
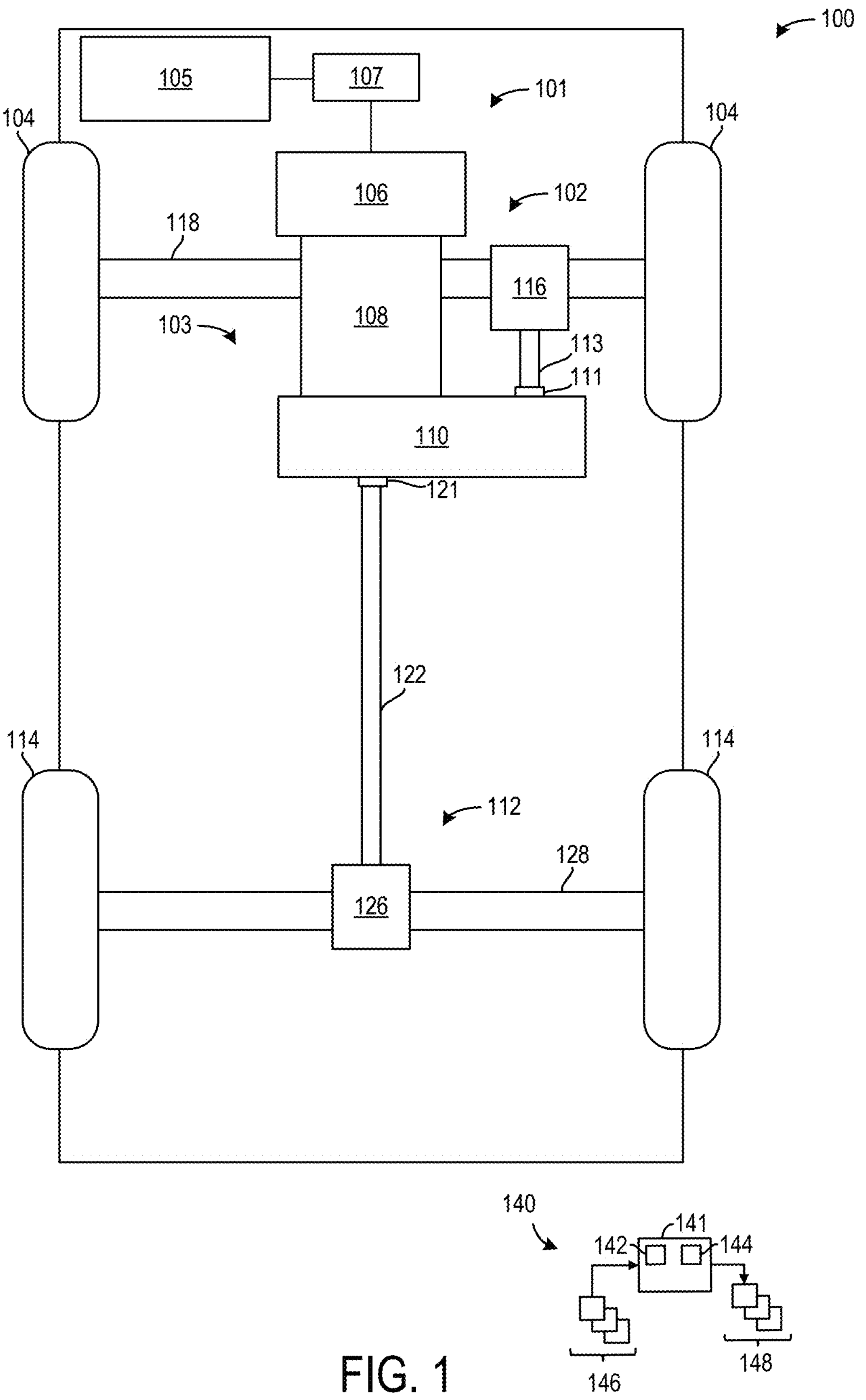
FIG. 1 shows an example schematic of a vehicle with a transmission which may include a gearbox of the present disclosure.
Figure 2:
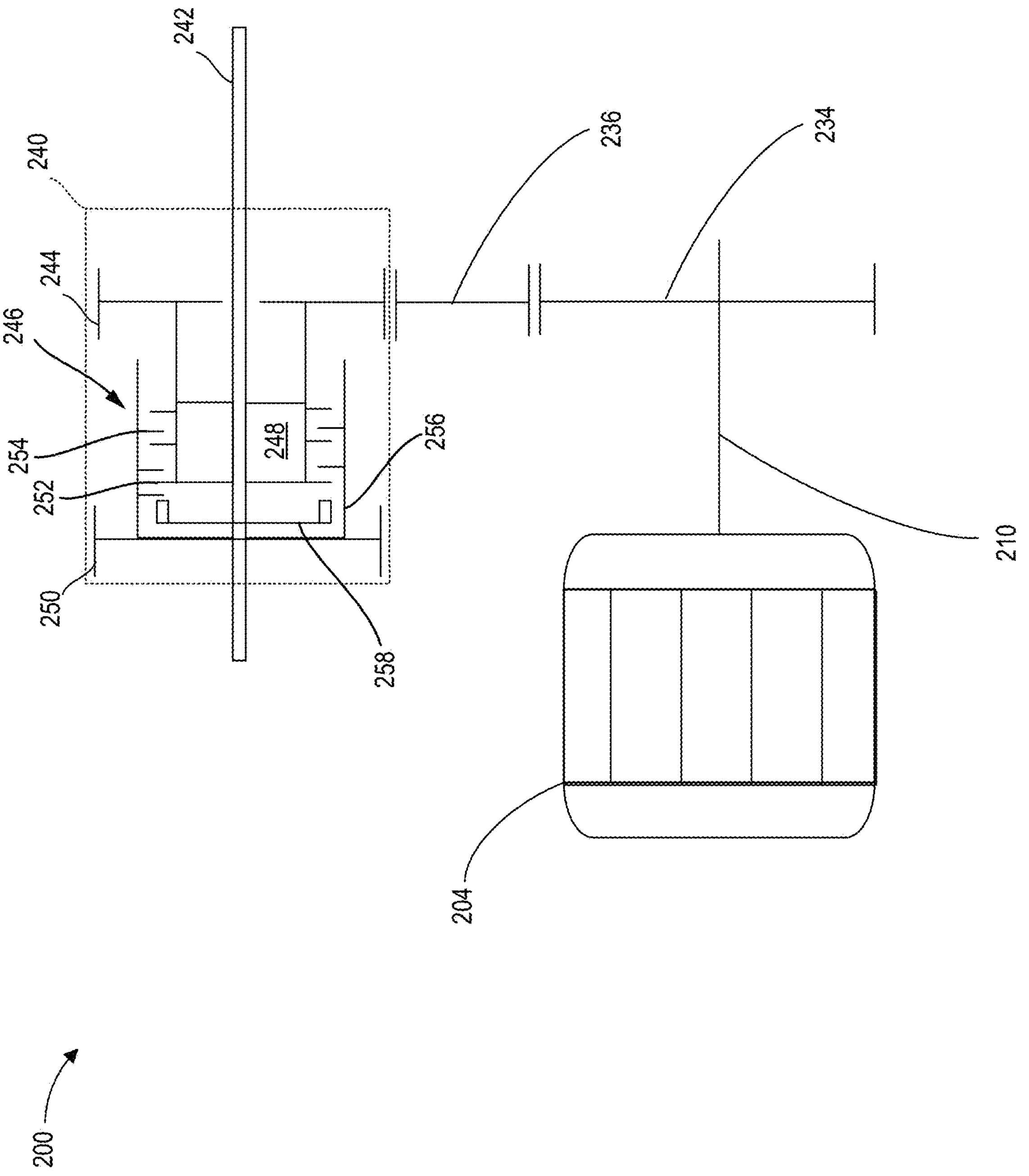
FIG. 2 shows an example of an electric drivetrain, according to an embodiment of the present disclosure.
Figure 3:
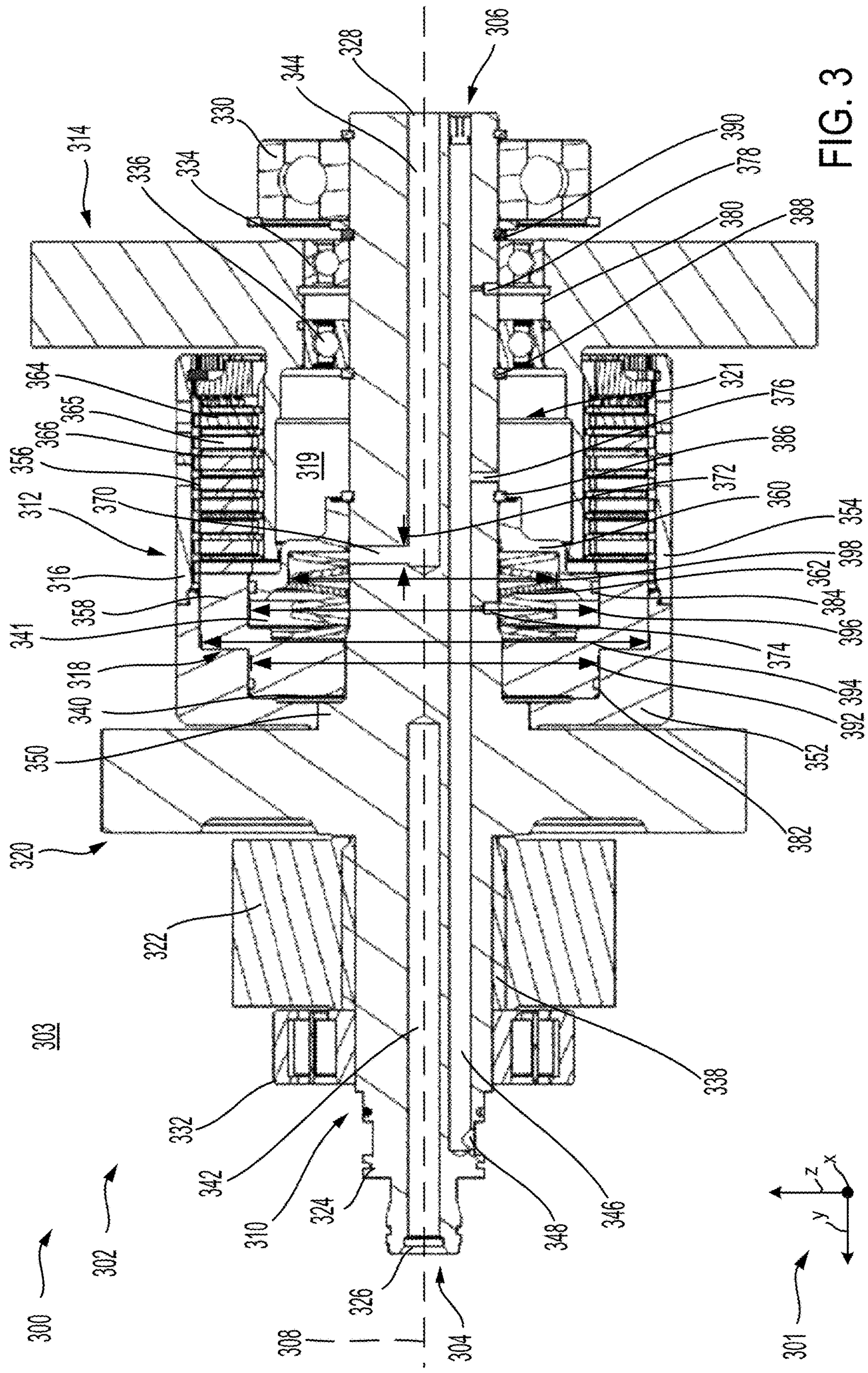
FIG. 3 shows a first view of an assembly including a hydraulic clutch of the present disclosure.
Figure 4:
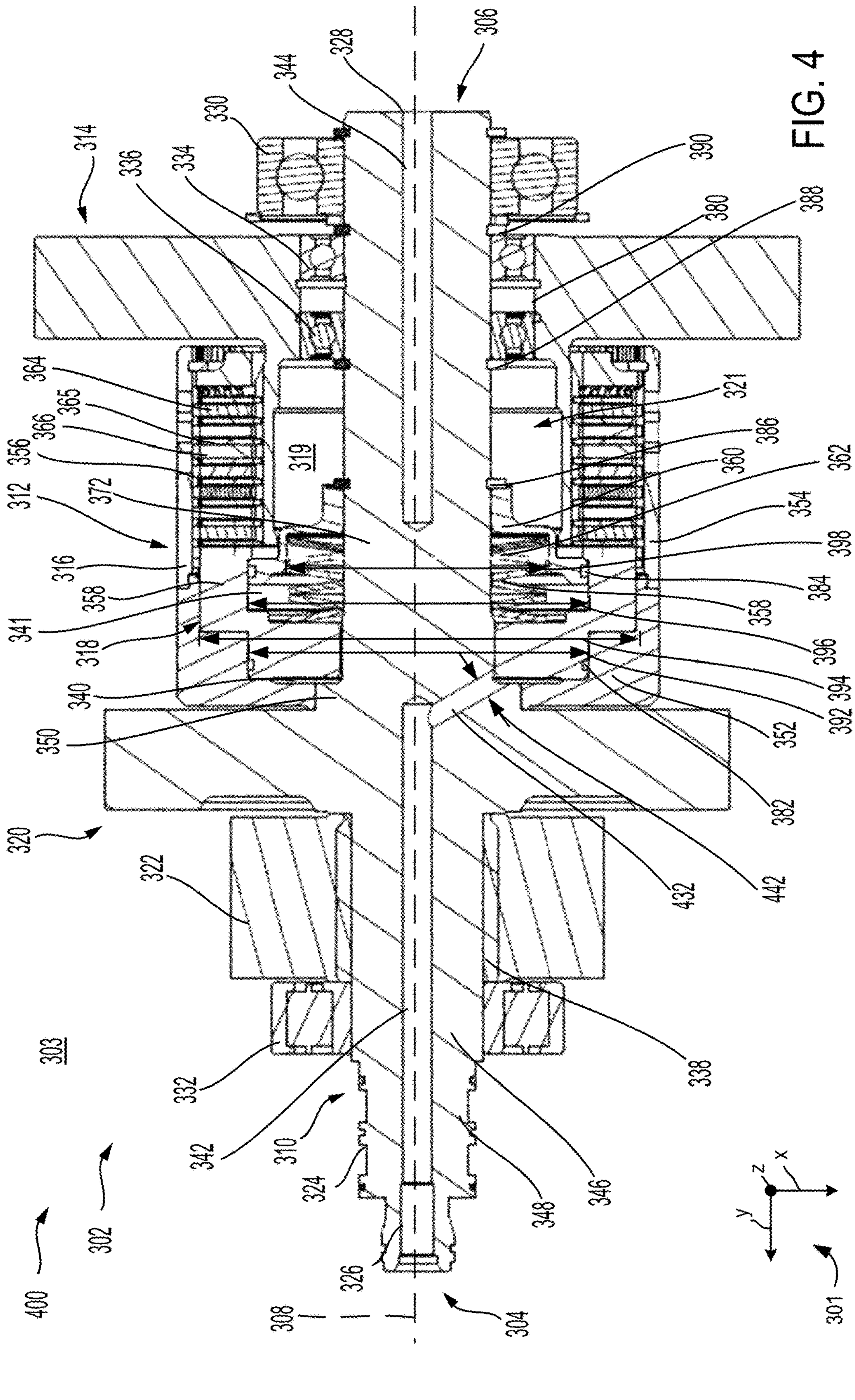
FIG. 4 shows a second view of the assembly of FIG. 3.
Figure 5:
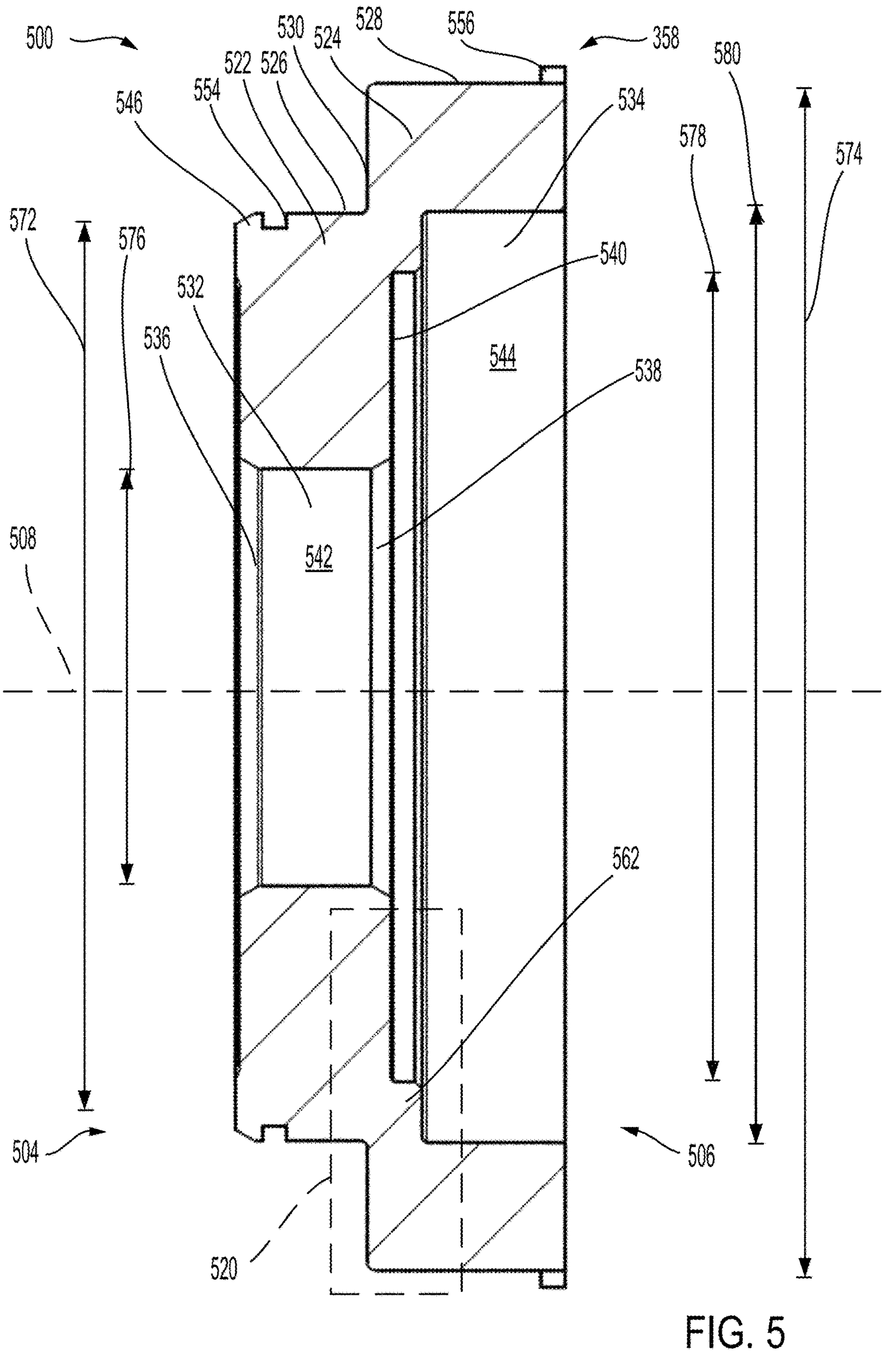
FIG. 5 shows a third view of a piston of the present disclosure from the assembly of FIGS. 3-4.
Figure 6:
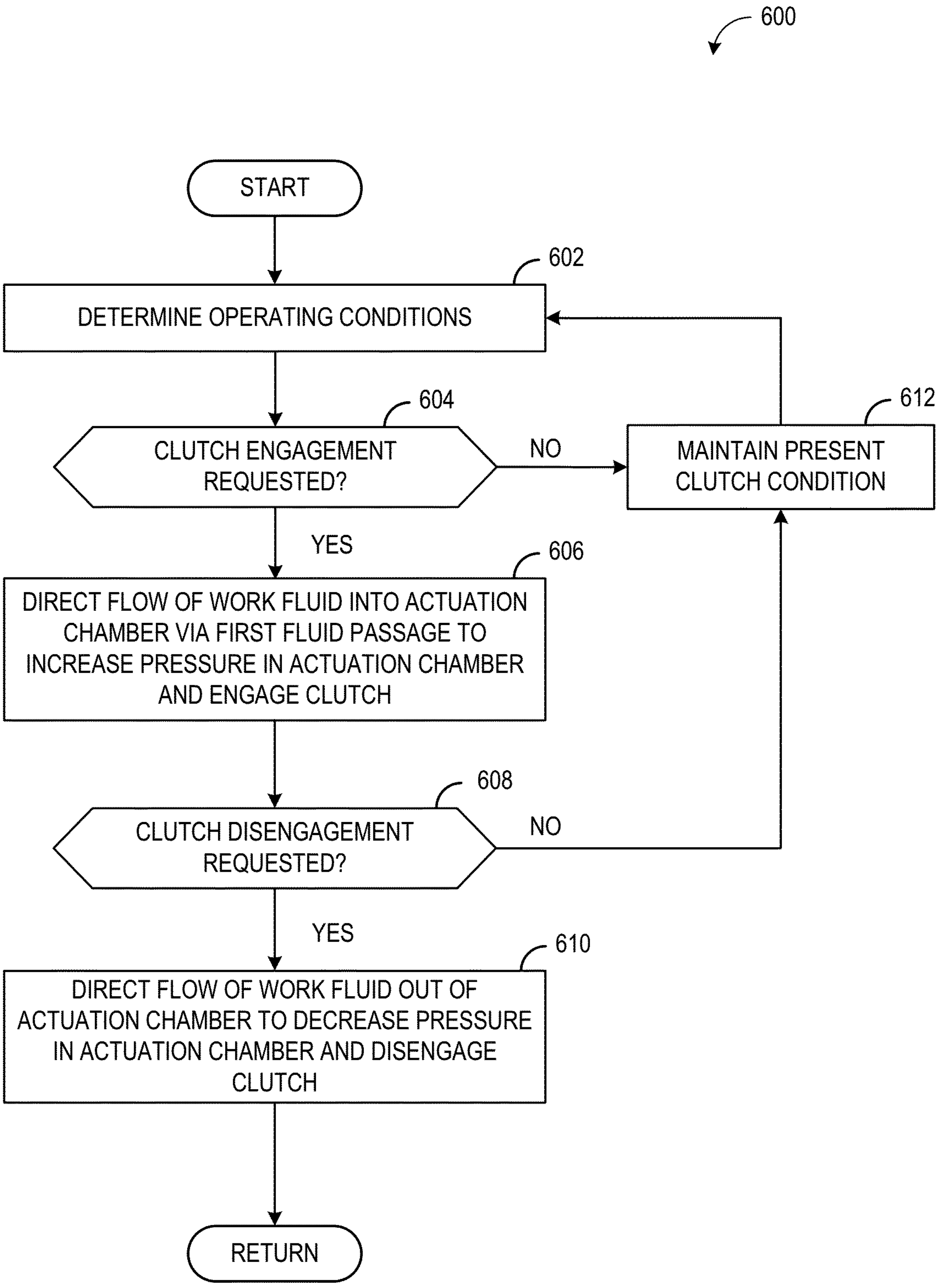
FIG. 6 shows a flow chart for an example method for actuating the hydraulic clutch.

FIG. 1 shows an example schematic of a vehicle which may include a present disclosure gearbox as part of the transmission. FIG. 2 shows an example of a portion of an electric drivetrain including an electric motor and a clutch. FIG. 3 shows a first view of an assembly including a hydraulic clutch of the present disclosure. FIG. 4 shows a second view of the assembly of FIG. 3. The first and second views of FIGS. 3-4 may be sectional views, where the first view is taken on a first plane or line perpendicular to a second plane or line that the second view may be taken on. FIG. 5 shows a third view of a piston of the present disclosure from the assembly of FIGS. 3-4. The third view of FIG. 5 may be a sectional view of the piston, where the third view shows the piston isolated from other components and features of assembly of FIGS. 3-4. FIG. 6 shows a flow chart for an example method for actuating the hydraulic clutch. FIGS. 3-5 are shown to scale; though other relative dimensions may be used without departing from the scope of the present disclosure.

Turning now to FIG. 1, a vehicle 100 is shown comprising a powertrain 101 and a drivetrain 103. The powertrain 101 comprises a prime mover 106 and a transmission 108. The prime mover 106 may be an internal combustion engine (ICE) or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting. In one example, the prime mover 106 is one of a plurality of prime movers, wherein each of the prime movers may include various of the powertrain components for supplying power to the wheels and/or other components of the vehicle 100.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that affect an efficiency of the inverter.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be used for industrial, locomotive, military, agricultural, and aerospace applications. In one example, the vehicle 100 is an all-electric vehicle or a vehicle with all-electric modes of operation, such as a plug-in hybrid vehicle. As such, the prime mover 106 is an electric machine. In one example, the prime mover 106 is an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

In some examples, additionally or alternatively, the vehicle 100 may be a hybrid vehicle including both an engine and an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, further comprising a second transmission arranged on the second set of axle shafts 128. Herein, the transmission 108 may be interchangeably referred to as a gearbox.

The vehicle 100 may also include a control system 140 with a controller 141. The controller 141 may include a processor 142 and a memory 144. The memory may hold instructions stored therein that when executed by the processor cause the controller 141 to perform various methods, control techniques, and the like described herein. The processor 142 may include a microprocessor unit and/or other types of circuits. The memory 144 may include known data storage mediums such as random access memory, read only memory, keep alive memory, combinations thereof, and the like. The controller 141 may receive various signals from sensors 146 positioned in different locations in the vehicle 100 and the drivetrain 103. The controller 141 may also send control signals to various actuators 148 coupled at different locations in the vehicle 100 and drivetrain 103. For instance, the controller 141 may send control signals to the prime mover 106, and in response to receiving the command signals, the electric machine may be adjusted to alter a rotor speed or torque. The other controllable components in the system may be operated in a similar manner with regard to sensor signals and actuator adjustment.

FIG. 2 shows an exemplary schematic of an electric drivetrain 200, including a clutch assembly 240 and an electric machine 204. The electric drivetrain 200 may be an example of the drivetrain 103 of FIG. 1. The electric machine 204 may be a prime mover, such as the prime mover 106 of FIG. 1. Alternatively, the electric machine 204 may be another mover besides the prime mover, such as if the drivetrain 200 is part of a hybrid vehicle.

The electric machine 204 may include an output shaft 210 on which a first gear 234 is arranged. The first gear 234 may be an output gear of the electric machine 204. Likewise, the first gear 234 may be an input gear of the electric drivetrain 200 and a transmission (not shown), such as the transmission 108 of FIG. 1. The first gear 234 may be meshed with a second gear 236, such that rotation of the first gear 234 rotates the second gear 236. The second gear 236 may be one of a plurality of gears of a transmission. For example, the second gear 236 may be arranged on and configured to rotate a shaft of the transmission (not shown in FIG. 2). Other gears of the plurality of gears of the transmission may also be arranged on the shaft of the transmission, or may be rotationally coupled to the second gear 236, such that rotation of the second gear 236 based on power received from the electric machine 204 via the first gear 234 rotates the plurality of gears of the transmission. Gears of the plurality of gears may be configured to amplify or reduce the torque received from the electric machine 204, and transmit the torque to components other than the clutch assembly 240. Additionally, the second gear 236 may be an intermediate gear of a gear set to the clutch assembly 240, such that when the second gear 236 is meshed with a rotational element of the clutch assembly 240, the rotational element may rotate in the same direction as the output shaft 210 and the first gear 234.

The clutch assembly 240, as represented herein by a dashed line box, may include an input gear 244 and an output gear 250, both of which are arranged about a shaft 242. At least one gear of the clutch assembly 240, such as the input gear 244 or the output gear 250, may fixedly couple to the shaft 242. The clutch assembly 240 may further include a clutch 246. One or more gears of the clutch assembly 240 may selectively couple to the shaft 242 via the clutch 246. The input gear 244 may mesh with the second gear 236. The output gear 250 may mesh with a complementary rotational element, such as another gear of another gear set. For example, the first gear 234, the second gear 236, and the input gear 244 may be part of an input gear set to the clutch 246. When fixedly coupled to the shaft 242, a gear may also be rotationally coupled to the shaft 242 such that the gear may rotate with rotation of the shaft. When selectively coupled to the shaft 242, the gear may be rotationally coupled with the shaft 242 such that the gear may rotate with rotation of the shaft. For example, the input gear 244 may selectively couple to the shaft 242 via the clutch 246, and the output gear 250 may be permanently coupled to the shaft 242.

The clutch assembly 240, and specifically the clutch 246, may include a hub 248, a drum 256, a plurality of separator plates 254, a plurality of friction plates 252, and a piston 258. The plurality of separator plates 254 and the plurality of friction plates 252 may be configured to selectively couple and decouple the hub 248 of the clutch 246 from the shaft 242 on which the clutch 246 is positioned. The hub 248 may be physically coupled to a gear that may rotate freely about the shaft 242. The drum 256 may be physically coupled to the shaft 242, either directly or via a gear that is physically coupled to the shaft 242. Positions of the plurality of separator plates 254 and the plurality of friction plates 252 may be adjusted based on a pressure of a fluid (e.g., a work fluid) acting upon the piston 258. The work fluid may be oil, for example. Further detail regarding selective engagement of the clutch 246 based on pressure of the working fluid is described with respect to FIGS. 3-5.

For example, the drum 256 may physically couple to the output gear 250, and the hub 248 may physically couple to the input gear 244. The plurality of friction plates 252 may selectively engage with the plurality of separator plates 254. The plurality of separator plates 254 may physically couple to the drum 256. The plurality of friction plates 252 may physically couple to the hub 248. The drum 256 may be positioned about the piston 258. Likewise, the piston 258 may be positioned between the hub 248 and portions of the drum 256. Each of the input gear 244 and the hub 248 may be supported by bearings, such that the input gear 244 and the hub 248 may rotate independently of the shaft 242.

When the plurality of friction plates 252 and the plurality of separator plates 254 are pressed together, the hub 248 may transfer power to the shaft 242. For example, power may be transferred from the hub 248 to the shaft 242 via the drum 256. As the drum 256 is physically coupled to the shaft 242 and the plurality of separator plates 254 are physically coupled to the drum 256, the plurality of friction plates 252 are physically coupled to the hub 248 and the hub 248 is physically coupled to the input gear 244, engagement of the plurality of separator plates 254 with the plurality of friction plates 252 directs rotational power from the input gear 244 to the shaft 242. When pressed together, the plurality of friction plates 252 and the separator plates 254 may be referred to as engaged. Engagement and disengagement of the plurality of friction plates 252 and the plurality of separator plates 254 may be executed via the piston 258. For example, the piston 258 may be actuated to extend towards and in contact with the plurality of friction plates 252 and/or the plurality of separator plates 254 to engage the plurality of friction plates 252 and the plurality of separator plates 254. When the plurality of friction plates 252 and the plurality of separator plates 254 are engaged, the clutch 246 is closed. When the clutch 246 is closed, the input gear 244 may be selectively coupled to the shaft 242 via the clutch 246. The piston 258 may be actuated to retract and remove force from the plurality of friction plates 252 and/or plurality of separator plates 254 to disengage the plurality of friction plates 252 and the plurality of separator plates 254, and thus open the clutch 246. When the clutch 246 is open, the input gear 244 may not be rotationally coupled to the shaft 242.

The output gear 250 may mesh with a complementary rotational element (not shown in FIG. 2), such as a gear of a downstream gear set of the transmission and/or a drive wheel (e.g., as described with respect to FIG. 1). The input gear 244 of the clutch assembly 240 may couple the clutch assembly 240 to the electric machine 204 via engagement of the input gear 244 with the second gear 236.

The second gear 236 may be an intermediate gear between the electric machine 204 and the clutch assembly 240. The second gear 236 may be meshed with, and thus cause rotation of, the input gear 244. For example, the input gear 244 may be rotated in the same direction as the output shaft 210 and the first gear 234 by rotation of the second gear 236. In some examples, the electric drivetrain 200 may include additional gears and/or other elements between the electric machine 204 and the clutch assembly 240 that are configured to amplify and/or reduce torque delivered to the clutch assembly 240 from the electric machine 204. In further examples, the electric machine 204 may include additional gears and/or other elements configured to amplify or reduce torque from the electric machine 204 and transmit torque from the electric machine 204 to components other than the clutch assembly 240.

It should be appreciated that the arrangement of gears and rotational elements of the electric drivetrain 200 described with respect to FIG. 2 may be non-limiting. For example, coupling of the clutch assembly 240 to the electric machine 204 may have other configurations than described herein without departing from the scope of the present disclosure. The second gear 236 may be omitted from the electric drivetrain 200 in some examples, and the first gear 234 may mesh with the input gear 244. In further examples, the input gear 244 may be physically coupled to the shaft 242 and the output gear 250 may be selectively coupled to the shaft 242 via the clutch 246.

FIG. 3 shows a first view 300 of a clutch assembly 302. The clutch assembly 302 may be an example of the clutch assembly 240 of FIG. 2. Some elements of the clutch assembly 302 are similarly named and numbered as those in FIG. 2 (e.g., the piston 258, a piston 358), and may not be reintroduced for brevity. A set of reference axes 301 are provided for comparison between views shown in FIGS. 3-5. The reference axes 301 indicate a y-axis, an x-axis, and a z-axis. In one example, the z-axis may be parallel with a direction of gravity and the x-y plane may be parallel with a horizontal plane that an assembly 302 may rest upon. When referencing direction, positive may refer to in the direction of the arrow of the y-axis, x-axis, and z-axis and negative may refer to in the opposite direction of the arrow of the y-axis, x-axis, and z-axis.

The first view 300 of FIG. 3 shows the clutch assembly 302 divided longitudinally to give a sectional side view. An exterior 303 may represent a volume, such as packing space, about the assembly 302. The assembly 302 may be centered on an axis 308. Axis 308 may be longitudinal. The axis 308 may be a rotational axis for the assembly 302, such that rotational elements of the assembly 302 may rotate or spin about axis 308. The assembly 302 may be located longitudinally between a first side 304 and a second side 306.

The assembly 302 includes a first gear 314, a second gear 320, a clutch 312, and a shaft 310. The first gear 314 may be an example of the input gear 244 of FIG. 2. The second gear 320 may be an example of the output gear 250 of FIG. 2. Likewise, the shaft 310 may be an example of the shaft 242 of FIG. 2. The shaft 310 may be centered about and rotated about the axis 308. The first gear 314, the second gear 320, and the clutch 312 may be positioned approximately radially about the shaft 310, such as to be centered about the shaft 310. The first gear 314 may be positioned nearest to the second side 306 and the second gear 320 may be positioned nearest to the first side 304, relative to one another. The second gear 320 may be physically coupled to the shaft 310. The clutch 312 may be positioned longitudinally between the first gear 314 and the second gear 320. The first gear 314 may be arranged to rotate freely about the shaft 310. The first gear 314 may be selectively coupled to the shaft 310 via the clutch 312.

The first gear 314 may receive an input torque from a rotational device, such as a gear, a shaft, or other similar device that outputs rotational power. The first gear 314 may transfer torque from the rotational device to the assembly 302, such as to the shaft 310, via engagement of the clutch 312. When the clutch 312 is closed, rotational energy may be transferred as torque from the first gear 314 to the shaft 310 and the second gear 320.

The clutch 312 may be a hydraulic clutch. For example, the clutch 312 may be a wet clutch. The clutch 312 may include a drum assembly 316 and a hub 319. The clutch 312 may be the clutch 246 of FIG. 2, where the hub 319 may be the hub 248 of FIG. 2. The drum assembly 316 may be or include the drum 256 of FIG. 2. The drum assembly 316 may physically couple to the shaft 310 and/or the second gear 320. The hub 319 may physically couple to the first gear 314. The drum assembly 316 may include a first cavity 318. The hub 319 may include a second cavity 321. The drum assembly 316 may be positioned about the hub 319, such that portions of the hub 319 may be housed in the first cavity 318.

The first cavity 318 may enclose at least two chambers. The chambers enclosed by cavity 318 include an actuation chamber 340 and a counter-pressure chamber 341. A portion of the counter-pressure chamber 341 may be enclosed by the hub and be housed in the second cavity 321. The actuation chamber 340 and the counter-pressure chamber 341 may each house work fluid. The actuation chamber may be a chamber that receives and is pressurized by work fluid to change the state of the clutch. Decrease in pressure to the actuation chamber 340 may disengage the clutch 312. Increase in pressure to the actuation chamber 340 may engage the clutch 312. The counter-pressure chamber 341 may provide a second centrifugal load opposite and equal to a first centrifugal load caused by the speed of rotation of the clutch assembly. Pressure may be supplied to the actuation chamber 340, and a level of pressure in the actuation chamber 340 may be adjusted by, at least a fluid passage fluidly coupled to the actuation chamber 340. Pressure may be supplied to the counter-pressure chamber 341, and a level of pressure in the counter-pressure chamber 341 may be adjusted by, at least a fluid passage fluidly coupled to the counter-pressure chamber 341.

The drum assembly 316 may physically couple to the shaft 310 at a land 350. The drum assembly 316 may be comprised of a plurality of sections physically coupled together. For an example of an embodiment, the drum assembly 316 may include a first section 352 and a second section 354. The first section 352 may be an arm component of the drum assembly 316 extending from the shaft 310 and/or second gear 320. The second section 354 may be a drum component of the drum assembly 316. The first section 352 may support and physically couple the second section 354. The first section 352 may physically couple and be positioned radially about the land 350. Specifically, the first section 352 and/or portions therein may extend radially outward from and be radially positioned around the land 350. The second section 354 may be cylindrical in shape and may be positioned about a clutch pack 356. For example, the second section 354 may be positioned radially around the clutch pack 356. The drum assembly 316 and the hub 319 may physically couple to and support components of the clutch pack 356. The second section 354 may physically couple to and support components of the clutch pack 356. Engagement of the clutch pack 356 may selectively couple the drum assembly 316 to the hub 319. Disengagement of the clutch pack 356 may selectively decouple the drum assembly 316 from the hub 319.

The clutch pack 356 may be engaged or disengaged via force from a piston 358. The piston 358 may transfer force when in surface sharing contact with the clutch pack 356. The piston 358 may be housed in the first cavity 318. The piston 358 may be of a shape with a plurality of inner and outer diameters. The volume of the actuation chamber 340 may be defined by surfaces of the first section 352 and the piston 358, where the actuation chamber 340 may be sandwiched between the first section 352 and the piston 358. A portion of the piston 358 may be positioned about a washer 360, such as to slide longitudinally about the washer 360. The washer 360 may be referred to herein as a counter washer 360. The counter-pressure chamber 341 may be sandwiched between the piston 358 and the counter washer 360. The volume of the counter-pressure chamber 341 may be defined by surfaces of the piston 358 and the counter washer 360. A spring 362 may be housed in counter-pressure chamber 341. The spring 362 may have surface sharing contact with and be sandwiched between the piston 358 and the counter washer 360. The spring 362 may be positioned about the shaft 310. For example, the spring 362 may be positioned radially around the shaft 310. Additionally or alternatively, there may be a plurality of springs housed in the counter-pressure chamber 341 and sandwiched between the piston 358 and the counter washer 360.

The spring 362 and/or other springs positioned in the counter-pressure chamber 341 may apply a resistive force via a spring force opposite to the direction of engagement for the piston 358. The work fluid housed by the counter-pressure chamber 341 may apply a resistive force via pressure opposite to the direction of engagement for the piston 358. The work fluid housed by the counter-pressure chamber 341 may provide a second centrifugal load opposite and approximately equal to a first centrifugal load of the work fluid housed by the actuation chamber 340. The second centrifugal load may allow for the spring 362, or other springs in the counter-pressure chamber 341, to have a lower mechanical strength and a lower spring force compared to a spring used for a clutch without the counter-pressure chamber 341.

The clutch pack 356 may include a plurality of separator plates 365 and a plurality of friction plates 366. The clutch pack 356 may also include an end plate 364. The hub 319 may include the friction plates 366 physically coupled thereto. The drum assembly 316 may include the separator plates 365 physically coupled thereto. The second section 354 may include the separator plates 365 physically coupled thereto. The end plate 364 may physically couple to the drum assembly 316, such as via coupling to the second section 354. A longitudinal force, such as from the piston 358, may close the clutch pack 356 via pressing the friction plates 366 into surface sharing contact with the separator plates 365. The clutch pack 356 may not have a pressure redistribution plate, such as a pressure redistribution disk.

A first seal 382 may be positioned approximately radially about the piston 358. For example, the first seal 382 may be positioned radially around the piston 358. A second scal 384 may be sandwiched approximately radially between the piston 358 and the counter washer 360. A third seal 386, a fourth seal 388, and a fifth seal 390, may be positioned approximately radially about the shaft 310. The first seal 382, the second seal 384, third seal 386, fourth seal 388, and fifth seal 390 may each fit to a complementary groove. The first seal 382 may fluidly seal the actuation chamber 340. Work fluid may be prevented from leaking between the actuation chamber 340 and other regions of the first cavity 318 via the first seal 382. The second seal 384 may fluidly seal the actuation chamber 340. Work fluid may be prevented from leaking between the counter-pressure chamber 341 and other regions of the first cavity 318 and the second cavity 321 via the second seal 384. The fourth and fifth seals 388, 390 may fluidly seal the through passage 380. Work fluid may be prevented from leaking between the through passage 380 and the second cavity 321 via the fourth seal 388. Work fluid may be prevented from leaking between the through passage 380 and the exterior 303 via the fifth seal 390.

The diameters of the first cavity 318, piston 358, and the counter washer 360 may vary, such that sections of first cavity 318, piston 358, and/or the counter washer 360 may be of different diameters. Likewise, the piston 358 may share diameters with the counter washer 360. For an example, the piston 358 may be of a first diameter 392 and a second diameter 394. The counter washer 360 may have a stepped portion. For example, the counter washer 360 may be of a third diameter 396 and a fourth diameter 398. The spring 362 may be positioned in the stepped portion of the counter washer 360. The first and second diameters 392, 394 may be outer diameters for a first section and a second section, respectively, of the piston 358. Additionally, the first diameter 392 may be an inner diameter for the second section of the piston 358. The third diameter 396 may be an outer diameter for the counter washer 360. The fourth diameter 398 may be an inner diameter for the counter washer 360. The section of the piston 358 of the first diameter 392 may host the first seal 382. The section of the counter washer 360 of the third diameter 396 may host the second seal 384. The first diameter 392 and the third diameter 396 may be approximately the same. The diameters of the first seal 382 and second seal 384 may therein be approximately the same. The actuation chamber 340 and the counter-pressure chamber 341 may therein have approximately the same diameter, where the first diameter 392 may be approximately the diameter of the actuation chamber 340 and the third diameter 396 may be approximately the diameter of the counter-pressure chamber 341. Centrifugal pressures and loads increase with the radius of a fluid body. With approximately the same diameters, the centrifugal pressure and load for the actuation chamber 340 may be approximately the same as the counter-pressure chamber 341.

At least a channel may fluidly couple the first passage 342 to the actuation chamber 340. Likewise, at least a channel may fluidly couple the second passage 344 to the counter-pressure chamber 341. For example, a first channel 370 may fluidly couple the second passage 344 to the counter-pressure chamber 341. The first channel 370 may be a work fluid overflow channel, via which work fluid may exit the counter-pressure chamber 341 and enter the second passage 344, therethrough. The first channel 370 may have a diameter 372. A plurality of openings and channels may direct fluid radially, with respect to the axis 308, outward from the third passage 346, away from the shaft and to components of the assembly 302. For example, the third passage 346 may be in fluid communication with a second channel 374, a third channel 376, and a fourth channel 378. The third passage 346 may fluidly couple to the counter-pressure chamber 341 via the second channel 374. The third passage 346 may fluidly couple to the second cavity 321 via the third channel

376. The third passage 346 may fluidly couple to a through passage 380 of the first gear 314 via the fourth channel 378. The through passage 380 may be positioned radially about the shaft 310. The through passage 380 may house and support the third and fourth bearing assemblies 334, 336. Work fluid that enters the through passage 380 may lubricate the third and fourth bearing assemblies 334, 336. The second and fourth channels 374, 378 may be orifice channels.

A component 322 may be positioned radially about the shaft 310, with respect to the axis 308. The component 322 may be sandwiched longitudinally between the second bearing assembly 332 and the second gear 320. The component 322 may be positioned about a sleeve 338. The component 322 may be nearest to the first side 304 from the second gear 320.

The shaft 310 may include a first opening 326 on the first side 304. Likewise, the shaft 310 may include a second opening 328 on the second side 306. The shaft 310 may include and/or be physically coupled to a fastening feature 324. The fastening feature 324 may be nearest to the first side 304. A first bearing assembly 330, a second bearing assembly 332, a third bearing assembly 334, and a fourth bearing assembly 336 may be located radially, with respect to the axis 308, about the shaft 310. The first bearing assembly 330 may be positioned nearest to the second side 306 and the second bearing assembly 332 may be positioned nearest to the first side 304 relative to one another. The third and fourth bearing assemblies 334, 336 may be positioned nearest to the second side 306 compared to the first side 304. The third and fourth bearing assemblies 334, 336 may be positioned radially between the first gear 314 and the shaft 310. The first and second bearing assemblies 330, 332 may support and allow the rotation of the shaft 310 within a corresponding housing. The third and fourth bearing assemblies 334, 336 may support and allow free rotation of the first gear 314 about the shaft 310. The first bearing assembly 330, the second bearing assembly 332, the third bearing assembly 334, and the fourth bearing assembly 336 may include a plurality of bearings, such as ball bearings or roller bearings.

The shaft 310 may include a plurality of passages. The plurality of passages may be arranged in an interior of the shaft 310 and configured to conduct fluid through an interior of the shaft 310 to one or more components arranged radially relative to the shaft 310. In one embodiment, the plurality of passages may include a first passage 342 and a second passage 344 that may be approximately centered about the axis 308, such as to be central passages. For example, the first passage 342 and the second passage 344 may be centered radially around the axis 308. The first passage 342 may fluidly couple the first opening 326. The second passage 344 may fluidly couple the second opening 328. For this embodiment, the shaft 310 may also include a third passage 346 that may be parallel with the axis 308. The third passage 346 may fluidly couple a third opening 348. The third opening 348 may be a port. The plurality of passages may conduct fluid in a longitudinal direction parallel to the axis 308. One or more of the plurality of passages may include one or more outlets for expelling or receiving fluid. For an example, the first passage 342 may receive fluid via the first opening 326. For this or another example, the second passage 344 may expel fluid via the second opening 328. The first passage 342 may be an actuation channel that supplies, removes, and pressurizes work fluid to the actuation chamber 340. The second passage 344 may be an overflow channel that receives and expels work fluid from the counter-pressure chamber 341. The third passage 346 may be a lubrication channel that transports work fluid to lubricate components of the assembly 302. The work fluid transported by the first passage 342, the second passage 344, and third passage 346 and used for actuation and lubrication of the assembly 302 may be oil, such as petroleum oil, synthetic oil, and the like.

Turning to FIG. 4, it shows a second view 400 of the assembly 302. The second view 400 may be a sectional side view of the assembly 302, dividing the assembly 302 longitudinally. The second view 400 may be taken on a plane perpendicular to the first view 300 of FIG. 3.

A fifth channel 432 may fluidly couple the first passage 342 to the actuation chamber 340. The fifth channel 432 may be may be an actuation channel, via which work fluid may exit the first passage 342 and enter the actuation chamber 340, therethrough. For example, the fifth channel 432 may be a work fluid supply channel, via which work fluid may enter the actuation chamber 340 from the first passage 342. Likewise, work fluid may exit the actuation chamber 340 and enter the first passage 342 via the fifth channel 432. Described another way, the actuation chamber 340 may be pressurized and depressurized from the first passage 342 using work fluid via the fifth channel 432. The fifth channel 432 may have a diameter 442. The diameter 442 may be the same distance as the diameter 372 of FIG. 3.

Turning to FIG. 5, it shows a third view 500 of the piston 358. The third view 500 may be a sectional side view of the piston 358, dividing the piston 358 longitudinally. The third view 500 shows the piston 358 separated from other components of the assembly 302. The piston 358 may be centered on an axis 508. The axis 508 may be longitudinal. The axis 508 may also be a rotational axis for the piston 358, such that the piston 358 may spin about axis 508. The axis 508 may be the axis 308 of FIG. 3. The piston 358 may be located longitudinally between a first side 504 and a second side 506.

The piston 358 may include a first portion 522 and a second portion 524. The first portion 522 and second portion 524 may include and be contiguous via a step section 520. The step section 520 is surrounded by a rectangle of dashed line, for illustrative purposes. The first portion 522 may have a first surface 526. The second portion 524 may have a second surface 528 and a third surface 530. The first surface 526 and second surface 528 may be cylindrical in shape. The third surface 530 may extend radially from the first portion 522. The first portion 522 may also have an edge 546, where edge 546 curves about the first portion 522. The edge 546 may be frustoconical in shape and may have a decreasing diameter when advancing longitudinally toward the first side 504.

The first portion 522 may have a passage 532. The second portion 524 may have a cavity 534. The passage 532 and the cavity 534 may be centrally located to the first portion 522 and second portion 524, respectively. The other sections of the first portion 522 may curve radially about the passage 532. Likewise, the other sections of the second portion 524 may curve radially about the cavity 534. The passage 532 may have a volume including a plurality of cylindrical and fustoconical shapes. The cavity 534 may have a volume including a plurality of cylindrical shapes. The passage 532 may have a first opening 536 and a second opening 538. The first opening 536 may face the first side 504. The second opening 538 may face and be contiguous with the cavity 534. The cavity 534 may include a counter hole 540. The counter hole 540 may be included as a feature by step section 520. The counter hole 540 may be contiguous with the surfaces of the second opening 538. The passage 532 may have a fourth surface 542. The cavity 534 may have a fifth surface 544. The fourth surface 542 and fifth surface 544 may be curved and cylindrical in shape. The fourth surface 542 and fifth surface 544 may be positioned radially about the axis 508. The fourth surface 542 may be cylindrical in shape. The fourth surface 542 may be located longitudinally between the first opening 536 and the second opening 538.

The first surface 526 may have a groove 554. The groove 554 may curve about the first portion 522 with and depress radially into the first surface 526. An outer seal for the piston 358, such as the first seal 382 of FIG. 3, may be complementary and fit to the groove 554. An inner seal of the piston 358, such as the second seal 384 of FIG. 3, may be housed in the cavity 534. When housed in the cavity 534, the inner seal may abut and seal against the fifth surface 544. The outer seal and the inner seal of the piston 358 may be at approximately the same diameter, such as when the outer seal is fit to the groove 554 and the inner seal abuts the fifth surface 544. The piston 358 may have a component 556, which may be a seal or a land. The component 556 may be hosted on and extend radially outward from the second surface 528. The step section 520 includes at least a step, such as a step 562. The step 562 is positioned about the counter hole 540, such as radially around the counter hole 540. The counter hole 540 may be created by the difference in diameter of the passage 532 and the step 562. The step 562 may create a difference in diameter between the counter hole 540 and the cavity 534. The step 562 may therein create a difference in diameter between the passage 532 and the cavity 534. The piston 358 may have a first diameter 572 and a second diameter 574 that may be outer diameters. The piston 358 may have a third diameter 576, a fourth diameter 578, and a fifth diameter 580. The first portion 522 may include the first diameter 572 as an outer diameter and the third diameter 576 as an inner diameter. The first surface 526 may be of the first diameter 572. The passage 532 may be of the third diameter 576. The second portion 524 may include: the second diameter 574 as an outer diameter, and the fourth diameter 578 and the fifth diameter 580 as inner diameters. The second surface 528 may be of the second diameter 574. The counter hole 540 may be of the fourth diameter 578. The fifth surface 544 may be of the fifth diameter 580. The first diameter 572 may be the diameter of the outer seal of the piston 358. Likewise, the fifth diameter 580 may be the diameter of the inner seal of the piston 358. The second diameter 574 may be greater in distance than the first diameter 572, the third diameter 576, the fourth diameter 578, and the fifth diameter 580. The fifth diameter 580 may be greater in distance than the third diameter 576 and fourth diameter 578. The first diameter 572 may be approximately the same distance as the fifth diameter 580. The first diameter 572 and the fifth diameter 580 may be the first diameter 392 and third diameter 396 of FIG. 3, respectively. The fourth diameter 578 may be greater than the third diameter 576. The third diameter 576 may be variable, where the third diameter 576 may decrease at the first opening 536, remain constant along the fourth surface 542, and increase at the second opening 538 when traveling along first side 504 and the second side 506 along the axis 508.

FIG. 6 shows a flow chart for an example method 600 for actuating a hydraulic clutch, such as the hydraulic clutch described with respect to FIGS. 1-5. Instructions for performing the steps of method 600 may be stored and performed by one or more controllers, such as the controller 141 of FIG. 1. For example, the method 600 may be stored in a memory of a vehicle, such as the memory 144, and be executed by a processor, such as the processor 142 of FIG. 1.

At 602, the method 600 includes determining operating conditions. The operating conditions may include transmission speed, transmission load, transmission torque, vehicle speed, operator torque request, operator speed request, prime power source speed, prime power source load, clutch positions, ambient temperature, transmission temperature, battery state of charge, tractive effort demand, and the like. These operating conditions may be determined using sensor data and/or modeling algorithms.

At 604, the method 600 includes determining if clutch engagement of a clutch is requested. If clutch engagement is not requested at 604 (e.g., NO at 604), the method 600 proceeds to 612 to maintain a present condition of the clutch. The method 600 returns to 602 to monitor vehicle operating conditions.

If clutch engagement is requested (YES at 604), the method 600 proceeds to 606. At 606, the method 600 includes directing a flow of a work fluid into an actuation chamber via a first fluid passage fluidly coupled to the actuation chamber to increase pressure in the actuation chamber and engage the clutch. Increasing pressure in the actuation chamber to engage the clutch includes actuating a piston to extend in a first direction and press against at least a plate of a plurality of plates of a clutch pack to move the plate(s) linearly, such as in a direction that is parallel with a central axis of the clutch. For example, the piston may press against and linearly move a plurality of friction plates to press against and engage the plurality of friction plates with a plurality of separator plates, thus closing the clutch and selectively coupling an input gear to a rotating shaft. The first direction is axial with respect to the central axis of the clutch. Further, actuating the piston may include directing a volume of the work fluid that is greater than a volume of the actuation chamber into a counter-pressure chamber. Increasing pressure in the actuation chamber may apply an actuation force that is opposite to (e.g., a counter pressure) a spring force of a spring that is configured to apply the spring force in a direction that is opposite to the first direction of engagement of the piston. Likewise, the actuation force from the pressure of the actuation chamber is applied opposite to a counter force from a counter-pressure provided by work fluid in the counter-pressure chamber. After pressure of the actuation chamber is increased above a threshold of pressure, the actuation force from the actuation chamber becomes greater than a net force from the counter-pressure chamber, including the spring force and the counter force. The actuation force may advance the piston in the first direction to compress the spring, and the clutch may close.

The method 600 proceeds to 608 to determine if clutch disengagement of the clutch is requested. If clutch disengagement is not requested at 608 (NO at 608), the method 600 proceeds to 612 to maintain a present condition of the clutch. The method 600 returns to 602 to monitor vehicle operating conditions.

If clutch disengagement is requested (YES at 608), the method 600 proceeds to 610. At 610, the method 600 includes directing a flow of the work fluid out of the actuation chamber via the first fluid passage to decrease pressure in the actuation chamber and disengage the clutch. Decreasing pressure in the actuation chamber to disengage the clutch includes actuating the piston to retract in a second direction, opposite the first direction, to physically separate from the plurality of friction plates and disengage the plurality of friction plates with the plurality of separator plates, thus opening the clutch and uncoupling the input gear from the rotating shaft. The pressure of the actuation chamber may be decreased to below the threshold of pressure. The net force of the spring force and the counter force from the counter-pressure chamber may become greater than the actuation force. The spring may expand, such that the spring force and the counter force move the piston to retract in the second direction, opening the clutch. After 610, the method 600 returns to start.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The disclosure also provides support for a hydraulic clutch comprising: a piston comprising a first portion for positioning an outer seal and a second portion for positioning an inner seal, where the outer seal and the inner seal share a common diameter, a drum, a washer, an actuation chamber defined between the piston and the drum, the actuation chamber comprising the outer seal and fluidly coupled to a work fluid supply channel, and a counter-pressure chamber defined between the piston and the washer, the counter-pressure chamber comprising the inner seal, a spring, and fluidly coupled to work fluid overflow channel. In a first example of the system, a shaft comprises a portion of the work fluid supply channel having a first diameter and a portion of the work fluid overflow channel having a second diameter, where the first diameter is equal to the second diameter. In a second example of the system, optionally including the first example, the counter-pressure chamber is configured to provide a first centrifugal load, and the actuation chamber is configured to provide a second centrifugal load, where the first centrifugal load is equal to the second centrifugal load. In a third example of the system, optionally including one or both of the first and second examples, the washer includes a stepped portion that is configured to have the spring positioned therein. In a fourth example of the system, optionally including one or more or each of the first through third examples, the washer includes a washer diameter that is in contact with the inner seal of the counter-pressure chamber. In a fifth example of the system, optionally including one or more or each of the first through fourth examples, the actuation chamber is configured to drive the piston. In a sixth example of the system, optionally including one or more or each of the first through fifth examples, the drum is fixedly coupled to an output gear. In a seventh example of the system, optionally including one or more or each of the first through sixth examples, the system further comprises: a hub fixedly coupled to an input gear. In an eighth example of the system, optionally including one or more or each of the first through seventh examples, a plurality of separator plates are fixedly coupled to the drum and a plurality of friction plates are fixedly coupled to the hub. In a ninth example of the system, optionally including one or more or each of the first through eighth examples, the plurality of friction plates are selectively engaged with the plurality of separator plates via actuation of the piston. In a tenth example of the system, optionally including one or more or each of the first through ninth examples, the drum is positioned about the piston and the piston is positioned between the hub and a portion of the drum. In an eleventh example of the system, optionally including one or more or each of the first through tenth examples, the input gear and the hub are supported on a shaft by bearings that enable the input gear and the hub to rotate independently of the shaft.

The disclosure also provides support for a transmission, comprising: a hydraulic clutch having a piston, a drum, and a washer, an actuation chamber defined between the piston and the drum and comprising an outer seal, and a counter-pressure chamber defined between the piston and the washer, the counter-pressure chamber comprising one or more of an inner seal, a spring, an inlet for a work fluid supply channel, and an outlet for a work fluid overflow channel. In a first example of the system, the drum comprises a first cavity and a hub of the piston includes a second cavity, where the drum is positioned about the hub such that portions of the hub are housed in the first cavity. In a second example of the system, optionally including the first example, the actuation chamber and the counter-pressure chamber are enclosed in the first cavity of the drum. In a third example of the system, optionally including one or both of the first and second examples, the spring is housed in the counter-pressure chamber and has surface sharing contact with, and is positioned between, the piston and a counter washer, where the spring is configured to apply a force that is opposite to direction of engagement of the piston.

The disclosure also provides support for a method for a hydraulic clutch, comprising: in response to receiving a first request for clutch engagement of a clutch, directing a flow of a work fluid into an actuation chamber via a first fluid passage fluidly coupled to the actuation chamber to increase pressure in the actuation chamber and engage the clutch, directing a volume of the work fluid that is greater than a volume of the actuation chamber into a counter-pressure chamber, and in response to receiving a second request for clutch disengagement of the clutch, directing a flow of the work fluid out of the actuation chamber via the first fluid passage to decrease pressure in the actuation chamber and disengage the clutch. In a first example of the method, increasing pressure in the actuation chamber to engage the clutch includes actuating a piston to extend in a first direction to linearly move a plurality of friction plates to engage the plurality of friction plates with a plurality of separator plates, thus closing the clutch and selectively coupling an input gear to a rotating shaft. In a second example of the method, optionally including the first example, decreasing pressure in the actuation chamber to disengage the clutch includes actuating the piston to retract in a second direction, opposite the first direction, to physically separate from the plurality of friction plates and disengage the plurality of friction plates with the plurality of separator plates, thus opening the clutch and uncoupling the input gear from the rotating shaft. In a third example of the method, optionally including one or both of the first and second examples, increasing pressure in the actuation chamber further comprises applying a counter pressure to a spring force of a spring that is configured to apply the spring force in a direction that is opposite to the first direction of engagement of the piston.

FIGS. 1-2 show schematics of example configurations with relative positioning of the various components. FIGS. 3-5 show example configurations with approximate positions. As used herein, the terms "approximately" is construed to mean plus or minus five percent of the range unless otherwise specified. FIGS. 3-5 are shown approximately to scale.

Further, FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to the longitudinal axis. Features described as lateral may be approximately parallel with the lateral axis and normal to the longitudinal axis.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydraulic clutch comprising:
- a piston comprising a first portion and a second portion, where the first portion and the second portion include and are contiguous via a step section;
- a drum;
- a washer;
- a first seal radially surrounding the piston between the first portion of the piston and the drum;
- a second seal radially surrounding the washer between the washer and the second portion of the piston, where the first seal and the second seal share a common diameter and are positioned in parallel;
- an actuation chamber defined between the piston and the drum, where the actuation chamber is fluidly coupled to an actuation channel and the first seal fluidly seals the actuation chamber in a radial direction parallel to a first diameter of the piston; and
- a counter-pressure chamber defined between the piston and the washer, where a rotational axis of the counter-pressure chamber is parallel to a rotational axis of the actuation chamber, where a diameter of the actuation chamber is equal to a diameter of the counter-pressure chamber, where the counter-pressure chamber is fluidly coupled to a fluid overflow channel, where the second seal fluidly seals the actuation chamber;
- wherein the actuation channel, the fluid overflow channel, and the rotational axis are coaxially aligned;
- wherein a lubrication channel is fluidly coupled to the counter-pressure chamber via a channel; and
- wherein the lubrication channel is parallel to and radially offset from the rotational axis.

2. The hydraulic clutch of claim 1, where a shaft comprises a portion of the actuation channel having a second diameter and a portion of the fluid overflow channel having a third diameter, and where the second diameter is equal to the third diameter.

3. The hydraulic clutch of claim 1, where the counter-pressure chamber is configured to provide a first centrifugal load, and the actuation chamber is configured to provide a second centrifugal load, and where the first centrifugal load is equal to the second centrifugal load.

4. The hydraulic clutch of claim 1, where the washer includes a stepped portion that is configured to have a spring positioned therein, where the stepped portion of the washer is a 90-degree offset between a first diameter and a second diameter of the washer, and where the step section of the piston is a 90-degree offset between the first portion of the piston and the second portion of the piston.

5. The hydraulic clutch of claim 4, where the washer includes a washer diameter that is in contact with the second seal.

6. The hydraulic clutch of claim 1, where the actuation chamber is configured to drive the piston.

7. The hydraulic clutch of claim 1, where the drum is fixedly coupled to an output gear and to a plurality of separator plates, and where rotational energy is transferred to the output gear when the piston is actuated to engage the plurality of separator plates with a plurality of friction plates.

8. The hydraulic clutch of claim 1, wherein the drum and the piston are positioned axially between an input gear and an output gear.

9. The hydraulic clutch of claim 1, where the fluid overflow channel is in fluidic communication with a bearing that supports an output gear.

10. The hydraulic clutch of claim 9, where the piston is positioned axially between the bearing and an input gear.

11. The hydraulic clutch of claim 1, where the piston is positioned axially between an input gear and an output gear.

12. The hydraulic clutch of claim 1, where a first surface of the first portion of the piston and a second surface of the second portion of the piston are cylindrical.

13. The hydraulic clutch of claim 1, where the fluid overflow channel is fluidly coupled to a passage configured to expel fluid.

14. A hydraulic clutch, comprising:

a drum comprising a first cavity;

a piston comprising a first portion including a groove that depresses radially into a first surface of the first portion, a second portion comprising a second cavity, and a step section that is contiguous between the first portion and the second portion, where a circumferentially outer surface of the first portion and a circumferentially outer surface of the second portion are both in face sharing contact with the drum;

a washer positioned in the second cavity of the piston;

a first seal positioned in the groove of the first portion of the piston and radially surrounding the piston between the first portion of the piston and the drum;

a second seal positioned in the second cavity of the second portion of the piston and radially surrounding the washer between the second portion of the piston and the washer;

an actuation chamber defined between a first surface of the piston and the drum and receiving fluid from an actuation channel;

a counter-pressure chamber defined in the second cavity between a second surface of the piston and the washer the second surface opposing the first surface, where the counter-pressure chamber is in fluidic communication with a fluid overflow channel; and a spring housed in the counter-pressure chamber, where the spring is in surface sharing contact with, and positioned between, the piston and the washer;

wherein the actuation channel, the overflow channel, and the rotational axis are coaxially aligned;

wherein a lubrication channel is fluidly coupled to the counter-pressure chamber via a third channel; and wherein the lubrication channel is parallel to and radially offset from the rotational axis; and wherein an output gear is positioned radially outward of the lubrication channel.

15. The hydraulic clutch of claim 14, further comprising a hub, where the drum is positioned about the hub such that portions of the hub are housed in the first cavity of the drum.

16. The hydraulic clutch of claim 15, where the actuation chamber is enclosed in the first cavity of the drum, and the first surface of the piston is planar in a vertical direction perpendicular to a central axis of the hydraulic clutch.

17. The hydraulic clutch of claim 14, where the spring is configured to apply a force that is opposite to direction of engagement of the piston.

* * * * *